US012326676B2

(12) United States Patent
Suzuki et al.

(10) Patent No.: US 12,326,676 B2
(45) **Date of Patent: *Jun. 10, 2025**

(54) IMAGE FORMING APPARATUS

(71) Applicant: CANON KABUSHIKI KAISHA, Tokyo (JP)

(72) Inventors: Kazushi Suzuki, Suntou-gun (JP); Takeshi Sugita, Yokohama (JP); Tamotsu Kaneko, Mishima (JP); Hisahiro Saito, Suntou-gun (JP); Yoichiro Maebashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/185,096

(22) Filed: Mar. 16, 2023

(65) Prior Publication Data

US 2023/0221662 A1 Jul. 13, 2023

Related U.S. Application Data

(63) Continuation of application No. 17/224,620, filed on Apr. 7, 2021, now Pat. No. 11,630,403, which is a (Continued)

(30) Foreign Application Priority Data

Feb. 10, 2017 (JP) ................................ 2017-023519

(51) Int. Cl.

| | |
|---|---|
| ***G03G 15/16*** | (2006.01) |
| ***G03G 15/01*** | (2006.01) |
| ***G03G 15/08*** | (2006.01) |

(52) U.S. Cl.

CPC ....... *G03G 15/161* (2013.01); *G03G 15/0121* (2013.01); *G03G 15/0868* (2013.01);

(Continued)

(58) Field of Classification Search

CPC ... G03G 15/0189; G03G 15/1605–162; G03G 15/0865–0879; G03G 2215/0121;

(Continued)

(56) References Cited

U.S. PATENT DOCUMENTS

| | | | | |
|---|---|---|---|---|
| 11,009,812 B2 * | 5/2021 | Suzuki | ............... | G03G 15/0868 |
| 11,630,403 B2 * | 4/2023 | Suzuki | ................ | G03G 15/161 399/223 |

(Continued)

FOREIGN PATENT DOCUMENTS

| | | |
|---|---|---|
| CN | 1776539 A | 5/2006 |
| CN | 101876800 A | 11/2010 |

(Continued)

OTHER PUBLICATIONS

Machine Translation of JP 2013-020126. (Year: 2013).*

*Primary Examiner* — Carla J Therrien

(74) *Attorney, Agent, or Firm* — Canon U.S.A., Inc. IP Division

(57) ABSTRACT

An image forming apparatus is capable of being attached with a toner supply container. The toner supply container stores a toner that is to be supplied to a developing portion. An attachment location of the toner supply container is below a light scanning portion in a vertical direction.

12 Claims, 11 Drawing Sheets

Related U.S. Application Data continuation of application No. 16/463,330, filed as application No. PCT/JP2018/004244 on Feb. 7, 2018, now Pat. No. 11,009,812.

(52) U.S. Cl.
CPC . *G03G 15/0867* (2013.01); *G03G 2215/0132* (2013.01); *G03G 2215/0685* (2013.01)

(58) Field of Classification Search
CPC ... G03G 2215/0122; G03G 2215/0125; G03G 2215/0132
See application file for complete search history.

(56) References Cited

U.S. PATENT DOCUMENTS

| | | | | |
|---|---|---|---|---|
| 2005/0013629 | A1* | 1/2005 | Ito | G03G 21/1671 399/116 |
| 2006/0093391 | A1 | 5/2006 | Uchida | |
| 2007/0231013 | A1* | 10/2007 | Hasdai | G03G 15/10 399/241 |
| 2008/0124155 | A1 | 5/2008 | Mimbu | |
| 2009/0035013 | A1* | 2/2009 | Sato | G03G 21/1803 399/119 |
| 2009/0185843 | A1* | 7/2009 | Chiba | G03G 21/0088 399/348 |
| 2010/0272476 | A1* | 10/2010 | Shima | G03G 15/0879 399/258 |
| 2010/0329738 | A1* | 12/2010 | Shirai | G03G 21/1633 399/124 |
| 2012/0076546 | A1* | 3/2012 | Rapkin | G03G 21/1676 399/258 |
| 2013/0078004 | A1* | 3/2013 | Matsumoto | G03G 15/0886 399/260 |

FOREIGN PATENT DOCUMENTS

| | | | | |
|---|---|---|---|---|
| CN | 101937182 | A | | 1/2011 |
| JP | 2011064775 | A | | 3/2011 |
| JP | 2013020126 | A | * | 1/2013 |

* cited by examiner

IMAGE FORMING APPARATUS

CROSS-REFERENCE TO RELATED APPLICATIONS

This application is a continuation of U.S. application Ser. No. 17/224,620, filed Apr. 7, 2021, which is a continuation of U.S. application Ser. No. 16/463,330, filed May 22, 2019, now U.S. Pat. No. 11,009,812, which is a National Stage filing of International Application No. PCT/JP2018/004244, filed Feb. 7, 2018, which claims the benefit of Japanese Patent Application No. 2017-023519, filed Feb. 10, 2017, each of which is hereby incorporated by reference herein in its entirety.

TECHNICAL FIELD

The present invention relates to an image forming apparatus, such as a copier, a printer, or a multifunction device, that forms images by using an electrophotographic system.

BACKGROUND ART

An electrophotographic image forming apparatus includes a toner supply container for supplying toner, which decreases with image formation, the toner supply container being detachably attached to a body of the image forming apparatus. An image forming apparatus such as a color machine including a plurality of developing portions includes a plurality of toner supply containers that correspond to the respective developing portions, the toner supply containers being detachably attached to the apparatus. (Japanese Patent Laid-Open Nos. 2014-178398, 2002-244529, 2016-31497, 2014-74890)

An attachment location of a toner supply container in a body of an image forming apparatus varies depending on the image forming apparatus. For example, in the image forming apparatus in FIG. 10 (Japanese Patent Laid-Open No. 2014-178398), toner supply containers 100Y, 100C, 100M, and 100K are disposed below a sheet tray 68 and above an image forming portion 300. In the image forming apparatus in FIG. 11 (Japanese Patent Laid-Open No. 2002-244529), an image forming portion 400 including developing portions is disposed above an intermediate transfer belt 75, and toner supply containers 65 are disposed below the intermediate transfer belt 75. Toner is conveyed from the toner supply containers 65 to the developing portions by passing over the intermediate transfer belt 75.

An increase in temperature around toner causes a deterioration in fluidity of the toner or causes the toner to solidify in a toner supply container. Thus, it is desirable to reduce transmission of heat to toner in toner supply containers, as much as possible.

However, in the structure described in Japanese Patent Laid-Open No. 2014-178398, the toner supply containers 100Y, 100C, 100M, and 100K are disposed below the sheet tray 68. Thus, the toner supply containers 100Y, 100C, 100M, and 100K are easily affected by the heat of a sheet discharged on the sheet tray 68. Moreover, the toner supply containers 100Y, 100C, 100M, and 100K, which are adjacent to a fixing unit 60, are easily affected by the heat of the fixing unit 60 itself. Furthermore, the toner supply containers 100Y, 100C, 100M, and 100K are also easily affected by the heat of an intermediate transfer belt 41 heated by coming into contact with a sheet that is heated by the fixing unit 60, for example, when an image is formed on a second surface during double-sided printing.

To prevent an increase in the temperature of the toners in the toner supply containers 100Y, 100C, 100M, and 100K, cooling by a fan and securing a space for heat insulation are required; however, these measures have drawbacks, such as an increase in costs and an increase in the size of the image forming apparatus.

In the structure described in Japanese Patent Laid-Open No. 2002-244529, the affect of heat is small compared with the structure in Japanese Patent Laid-Open No 2014-178398. However, there is a need to dispose toner conveyance mechanisms 90, 91, 92, and 93, which are for supplying toners from the toner supply containers 65 to the developing portions, at positions that do not overlap the intermediate transfer belt 75. The need to dispose the toner conveyance mechanisms 90, 91, 92, and 93 so as to pass over the intermediate transfer belt 75 increases the depth of the image forming apparatus.

CITATION LIST

Patent Literature

PTL 1: Japanese Patent Laid-Open No. 2014-178398
PTL 2: Japanese Patent Laid-Open No. 2002-244529
PTL 3: Japanese Patent Laid-Open No. 2016-31497
PTL 4: Japanese Patent Laid-Open No. 2014-74890

SUMMARY OF INVENTION

To address the above drawbacks, the present invention provides an image forming apparatus that suppresses an increase in the temperature of a toner supply container while avoiding an increase in the size of the apparatus.

The present invention relates to an image forming apparatus including a photosensitive member; a light scanning portion that is disposed below the photosensitive member in a vertical direction and scans the photosensitive member with a beam corresponding to image information; a developing portion that develops an electrostatic latent image formed on the photosensitive member by using a toner; an intermediate transfer belt that is disposed above the photosensitive member in the vertical direction and onto which a toner image formed on the photosensitive member is transferred; and a sheet tray that is disposed above the intermediate transfer belt in the vertical direction and receives a sheet output from inside the image forming apparatus, the image forming apparatus transferring the toner image transferred on the intermediate transfer belt onto a sheet and then outputting the sheet onto the sheet tray. The image forming apparatus is capable of being attached with a toner supply container, the toner supply container storing a toner to be supplied to the developing portion. An attachment location of the toner supply container is below the light scanning portion in the vertical direction.

The present invention also relates to an image forming apparatus including a photosensitive member; a light scanning portion that is disposed below the photosensitive member in a vertical direction and scans the photosensitive member with a beam corresponding to image information; a developing portion that develops an electrostatic latent image formed on the photosensitive member by using a toner; an intermediate transfer belt that is disposed above the photosensitive member in the vertical direction and onto which a toner image formed on the photosensitive member is transferred; and a sheet tray that is disposed above the intermediate transfer belt in the vertical direction and receives a sheet output from inside the image forming apparatus, the image forming apparatus transferring the toner image transferred on the intermediate transfer belt onto a sheet and then outputting the sheet onto the sheet tray. The image forming apparatus includes a toner supply container that stores a toner to be supplied to the developing portion, the toner supply container being disposed below the light scanning portion in the vertical direction.

Further features of the present invention will become apparent from the following description of exemplary embodiments with reference to the attached drawings.

DESCRIPTION OF EMBODIMENTS

First Embodiment

Figure 1:
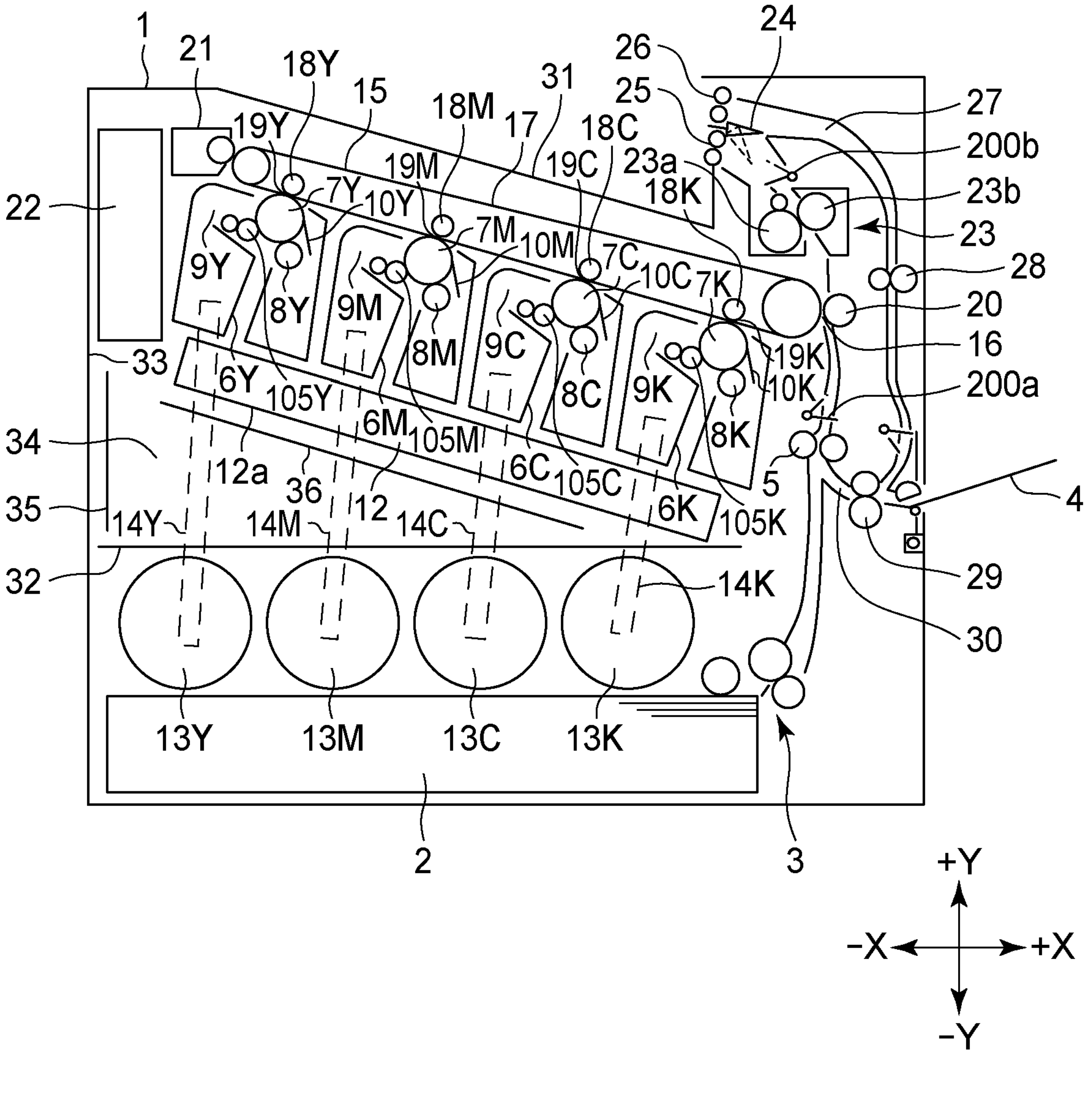
FIG. 1 is a sectional view of an image forming apparatus according to a first embodiment.

FIG. 1 is a sectional view of the overall structure of a body 1 of an image forming apparatus. The apparatus according to the first embodiment is a laser beam printer capable of printing a color image on a sheet.

Sheet Feeding

Reference symbol 1 denotes a body of the image forming apparatus, reference symbol 2 denotes a cassette that is attachable and detachable to and from the body 1 and stores a sheet, and reference symbol 3 denotes a sheet feeding portion. Reference symbol 4 denotes a manual sheet feeding portion, and reference symbol 5 denotes a registration roller that adjusts the skew of a sheet. Reference symbol 200*a* denotes a conveyance sensor that detects passage of a sheet.

Image Forming Portion

The image forming apparatus includes four image forming portions 6Y, 6M, 6C, and 6K corresponding to yellow, magenta, cyan, and black, respectively. Hereinafter, the image forming portions 6Y, 6M, 6C, and 6K are collectively referred to as the image forming portions 6 by omitting the alphabetical characters for simplicity. The same applies to other components. Each image forming portion 6 includes a photosensitive member 7Y, 7M, 7C, or 7K (photosensitive member 7) corresponding thereto and a charging portion 8Y, 8M, 8C, or 8K (charging portion 8) corresponding thereto. Each charging portion 8 charges a surface of the photosensitive member 7 corresponding thereto. Each image forming portion 6 further includes a developing portion 9Y, 9M, 9C, or 9K (developing portion 9) corresponding thereto and a cleaner 10Y, 10M, 10C, or 10K (cleaner 10) corresponding thereto. Each developing portion 9 develops an electrostatic latent image formed on the photosensitive member 7 corresponding thereto by using a toner. Each cleaner 10 removes residual toner on the photosensitive member 7 corresponding thereto. Reference symbols 105Y, 105M, 105C, and 105K each denote a developing roller (developing roller 105), which is for supplying a toner to the photosensitive member 7 corresponding thereto. Reference symbol 12 denotes a light scanning portion (scanner unit) that scans the photosensitive members 7 with a beam corresponding to image information. The scanner unit 12 is disposed below the photosensitive members 7 in a vertical direction (Y-axis direction). The scanner unit 12 according to the first embodiment is a laser scanner unit that deflects a laser beam emitted from a semiconductor laser by using a rotatable polygonal mirror and scans the photosensitive members 7.

Transferring

An intermediate transfer unit 15 is disposed above the developing portions 9. For downsizing the apparatus, the intermediate transfer unit 15 is disposed obliquely (disposed so as to incline relative to a horizontal direction (X-axis direction)) so as to be lowered on the side of a secondary transfer portion 16 (the right side is lowered and the left side is raised in FIG. 1). Due to the oblique disposition, the image forming portions 6 and the scanner unit 12 are also disposed obliquely. The intermediate transfer belt 17, onto which toner images formed on the photosensitive members 7 are transferred, is a rotatable endless belt that is stretched around a plurality of stretching rollers. The intermediate transfer belt 17 has an inner surface in contact with primary transfer rollers 18Y, 18M, 18C, and 18K (primary transfer rollers 18), which are primary transfer members. The primary transfer rollers 18 and the photosensitive members 7 with the intermediate transfer belt 17 interposed therebetween form primary transfer portions 19Y, 19M, 19C, and 19K (primary transfer portions 19) corresponding thereto. At the primary transfer portions 19, a voltage is applied to the primary transfer rollers 18 such that the toner images on the photosensitive members 7 are transferred onto the intermediate transfer belt 17. The intermediate transfer belt 17, the plurality of stretching rollers tensioning the intermediate transfer belt 17, and the primary transfer rollers 18 are integral as the intermediate transfer unit 15 so as to be attachable and detachable to and from the body 1 of the image forming apparatus.

A secondary transfer roller 20, which is a secondary transfer member, is in contact with the intermediate transfer belt 17. The secondary transfer roller 20 and a roller on an opposite side with the intermediate transfer belt 17 interposed therebetween form the secondary transfer portion 16. At the secondary transfer portion 16, the toner images transferred on the intermediate transfer belt 17 are secondarily transferred onto a sheet. Residual toner on the intermediate transfer belt 17 is removed by using a cleaning unit 21 after the secondary transfer. The toner removed by the cleaning unit 21 is conveyed to a toner collection container 22.

Fixing

The sheet on which the toner images are transferred at the secondary transfer portion 16 is conveyed to a fixing portion 23. The fixing portion 23 includes a heating unit 23*a* and a pressure roller 23*b*. The heating unit 23*a* includes a heat source. The heating unit 23*a* and the pressure roller 23*b* form a fixing nip portion. While the sheet that carries the unfixed toner images is conveyed to the fixing nip portion and nipped at the fixing nip portion, the toner images are thermally fixed onto the sheet. Reference symbol **200*b*** denotes a conveyance sensor that detects passage of a sheet.

Sheet Discharging, Double-Sided Printing, Sheet Re-Feeding

Reference symbol 24 denotes a double-sided flapper. The double-sided flapper 24 switches a conveyance destination of the sheet that has passed through the fixing portion 23 to a pair of discharging rollers 25 or to a pair of switchback rollers 26. In double-sided printing, the sheet is conveyed to the pair of switchback rollers 26. Then, after the pair of switchback rollers 26 nipping the sheet is turned in reverse to cause an end portion of the sheet that is a trailing end of the sheet to be a leading end of the sheet, the sheet is conveyed to a double-sided conveyance path 27. The double-sided conveyance path 27 includes a pair of conveyance rollers 28 and a pair of sheet re-feeding rollers 29. The sheet is conveyed back to the registration rollers 5 via these pairs of rollers. A U-turn portion 30 is present at a terminal end of the double-sided conveyance path 27. The pair of sheet re-feeding rollers 29 is disposed at the U-turn portion 30 for stable performance in terms of conveyance to the registration rollers 5. At the secondary transfer portion 16, toner images are transferred onto a second surface of the sheet that has passed through the pair of sheet re-feeding rollers 29 and the registration rollers 5. Reference symbol 31 denotes a sheet tray that is disposed above the intermediate transfer belt 17 in the vertical direction and receives a sheet output from inside the apparatus. The sheet on which the toner images are transferred at the secondary transfer portion 16 is conveyed to the pair of discharging rollers 25 via the fixing portion 23 and discharged onto the sheet tray 31.

Toner Supply Container

The apparatus according to the first embodiment is capable of forming a color image on a sheet by using toners of different colors and is capable of being attached with a plurality of toner supply containers that correspond to the respective toners of the different colors. Between the scanner unit 12 and the cassette 2, four toner supply containers 13Y, 13M, 13C, and 13K (toner supply containers 13) are disposed in a substantially horizontal direction (the direction substantially parallel to the X-axis direction). Each toner supply container 13 stores a toner to be supplied to the developing portion 9 corresponding thereto. The toner supply containers 13 are attachable and detachable to and from the body 1 of the image forming apparatus in the Z-axis direction. The inside of each toner supply container 13 is filled with a supplemental toner. The toner is supplied to the corresponding developing portion 9 via the toner conveyance mechanism 14Y, 14M, 14C, or 14K (toner conveyance mechanism 14) corresponding thereto.

An attachment location of each toner supply container 13 is below the scanner unit 12 in the vertical direction. Being disposed below the scanner unit 12, the toner supply containers 13 are not easily affected by the heat of the sheet discharged on the sheet tray 31. Moreover, being separated from the fixing portion 23, the toner supply containers 13 are not easily affected by the heat of the fixing portion itself. The toner supply containers 13 are also not easily affected by the heat of the intermediate transfer belt 17, which is heated due to contact with the sheet. Disposition of the toner supply containers 13 below the scanner unit 12 reduces the length of the optical path to the photosensitive members 7 compared with a structure in which the toner supply containers 13 are disposed above the scanner unit 12. The short length of the optical path enables a reduction in the sensitivity of an optical lens. Therefore, a stable spot diameter can be obtained, and high image quality is easily realized. In addition, it is possible to prepare the scanner unit 12 at low cost because the tolerances of the components of the toner supply containers 13 less affect the scanner unit 12. The developing portions 9, the toner supply containers 13, and the toner conveyance mechanisms 14 will be described later in detail. The toner supply containers 13 are disposed below the U-turn portion 30. In other words, the body 1 of the apparatus includes the double-sided conveyance path to be used when toner images are formed on a second surface of a sheet, and the attachment locations of the toner supply containers 13 are provided below the double-sided conveyance path in the vertical direction. Such a structure enables the toner supply containers 13 to avoid being easily affected by the heat of the sheet heated by passing through the fixing portion 23.

Power Supply Unit

As described above, the scanner unit 12 is disposed obliquely relative to the horizontal direction. Thus, the body 1 of the apparatus has a space 34 having a substantially triangular section. The space 34 is defined by a bottom surface **12*a* of the scanner unit 12, a partition plate 32 disposed directly above the toner supply containers 13, and a left side wall 33 of the body 1 of the apparatus. In the space 34, a low-voltage power supply unit 35 and a high-voltage power supply unit 36 are disposed. The low-voltage power supply unit 35 generates a voltage that is to be applied to, for example, various motors, a fan, and a solenoid mounted on the image forming apparatus. The high-voltage power supply unit 36 generates a voltage that is applied to, for example, the charging portions 8, the developing portions 9, the primary transfer rollers 18, and the secondary transfer roller 20**.

Details of Developing Portion 9

Figure 2:
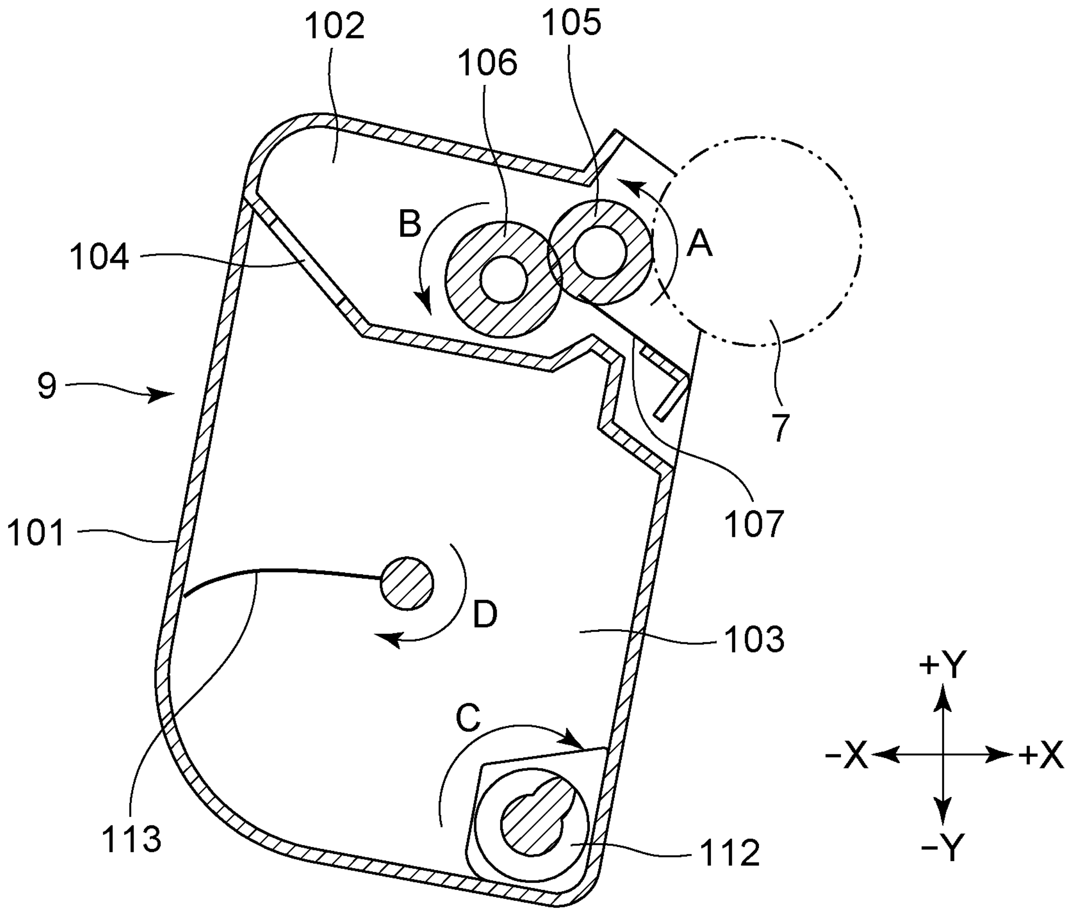
FIG. 2 is a sectional view of a developing portion of the image forming apparatus according to the first embodiment.
Figure 3:
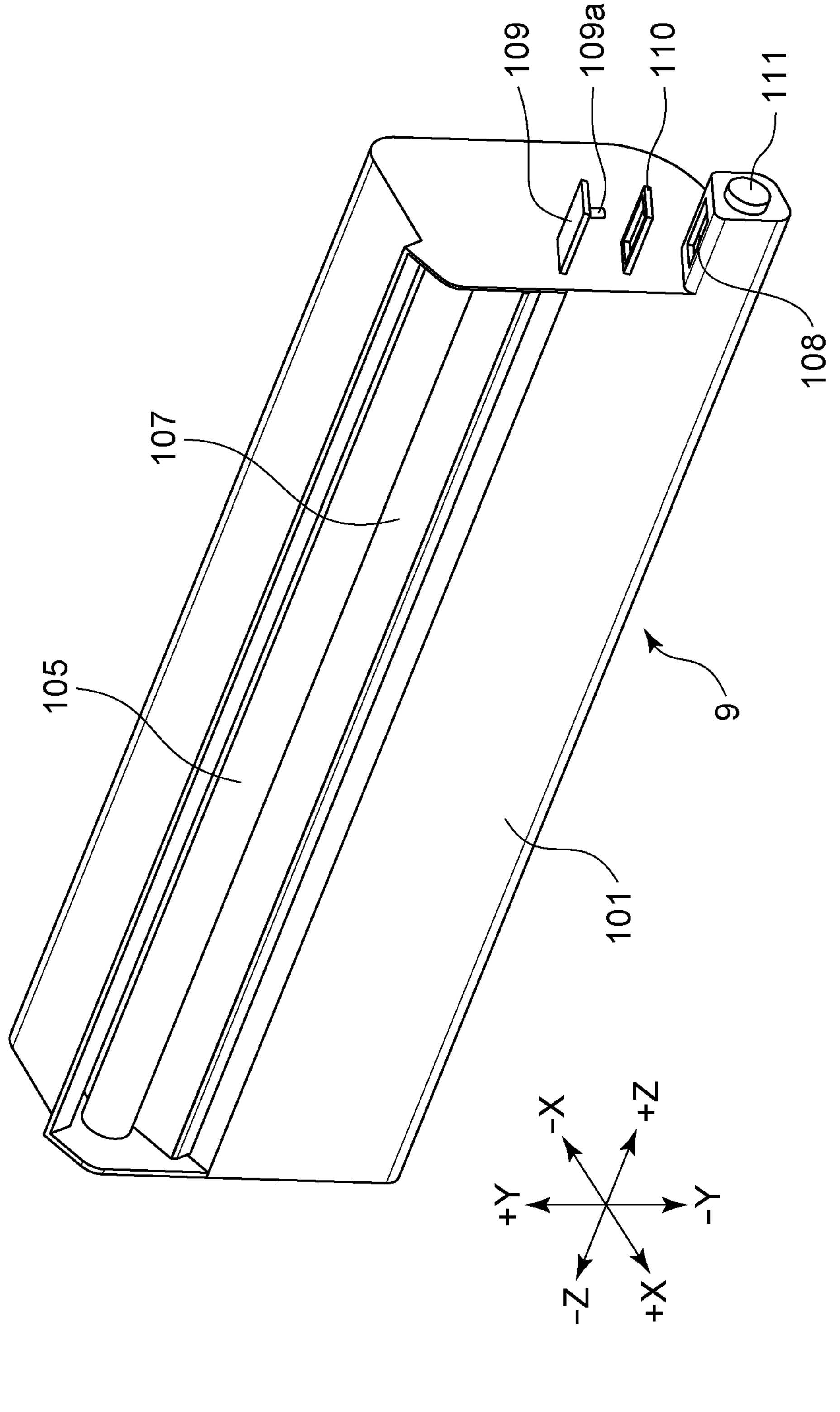
FIG. 3 is a perspective view of the developing portion of the image forming apparatus according to the first embodiment.

Each developing portion 9 will be described in detail on the basis of FIGS. 2 and 3. FIG. 2 is a sectional view of the developing portion 9. FIG. 3 is a perspective view of the developing portion 9 from the far side of the sheet of FIG. 1.

As illustrated in FIG. 2, the developing portion 9 includes a frame 101 that supports various components inside the developing portion 9. The frame 101 is divided into a developing chamber 102 and a reception-side toner storage chamber 103. The developing chamber 102 and the reception-side toner storage chamber 103 are connected to each other via an open portion 104. In the developing chamber 102, the developing roller 105 corresponding thereto, a toner supply roller (hereinafter referred to as "supply roller") 106, and a developing blade 107 are disposed. The developing roller 105 turns in the arrow-A direction by coming into contact with the photosensitive member 7 corresponding thereto. The supply roller 106 turns in the arrow-B direction while being in contact with the developing roller 105 corresponding thereto. The supply roller 106 has two functions. One is removing residual toner on the corresponding developing roller 105. Another is supplying toner onto the corresponding developing roller 105. The developing blade 107 controls the layer thickness of the toner on the developing roller 105 by coming into contact with a peripheral surface of the developing roller 105. The reception-side toner storage chamber 103 stores the toner supplied from the toner supply container 13 corresponding thereto.

As illustrated in FIG. 3, a rear-side wall surface of the reception-side toner storage chamber 103 includes a toner receiving opening 108, a shutter 109, and a seal 110 that fills a gap between the toner receiving opening 108 and the shutter 109. In FIG. 3, the toner receiving opening 108, the shutter 109, and the seal 110 are illustrated in a separated manner to describe structures; however, the seal 110 is actually integral with the shutter 109. The shutter 109 is supported by the frame 101 so as to be turnable with a supporting point 109*a* serving as the pivot. When the developing portion 9 is not attached to the body 1 of the image forming apparatus, the shutter 109 closes the toner receiving opening 108. When the developing portion 9 is attached to the body 1 of the image forming apparatus, the shutter 109 comes into contact with a projection (not shown) formed inside the body 1 and thereby slides and turns to open the toner receiving opening 108. The rear-side wall surface of the reception-side toner storage chamber 103 includes a driving gear 111. The driving gear 111 is connected to a toner conveyance member 112 (FIG. 2) that is disposed inside the reception-side toner storage chamber 103, thereby causing the toner conveyance member 112 to turn. The toner conveyance member 112 is a resin screw having a spiral shape.

As illustrated in FIG. 2, the toner supplied through the toner receiving opening 108 is received by the toner conveyance member 112. The toner conveyance member 112 turns in the arrow-C direction to spread the toner over the inside of the reception-side toner storage chamber 103. Then, the toner is supplied through the open portion 104 to the developing chamber 102 while a stirring member 113 stirs the toner by turning in the arrow-D direction. The toner supplied into the developing chamber 102 is supplied onto the photosensitive member 7 corresponding thereto via the supply roller 106 and the developing roller 105. The stirring member 113 can be turned by a drive train (not shown) disposed inside the developing portion 9.

Details of Toner Supply Container 13

Figure 4:
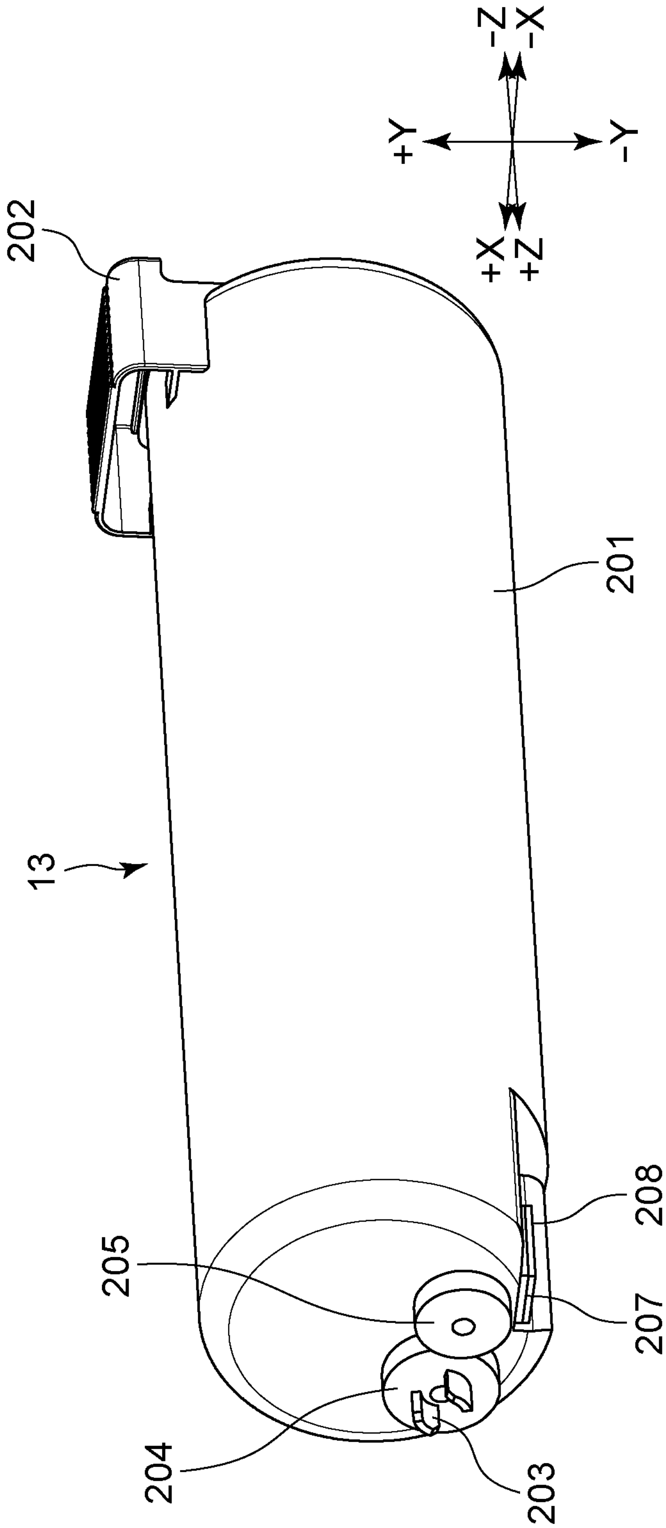
FIG. 4 is a perspective view of a toner supply container according to the first embodiment.
Figure 5:
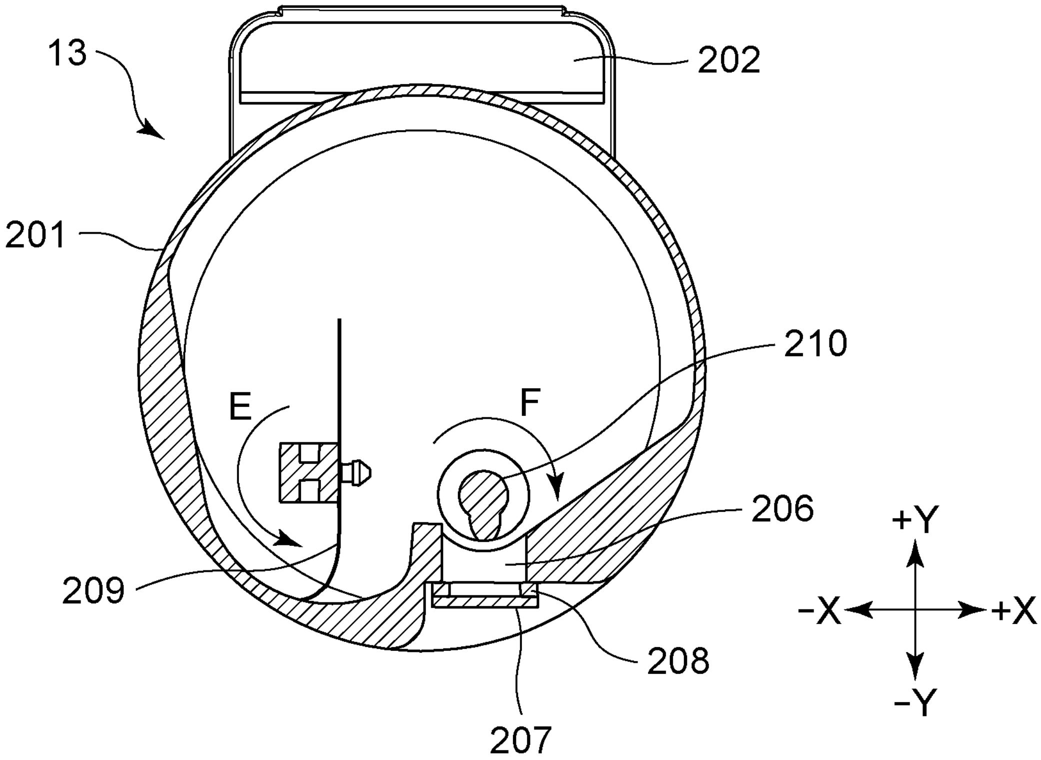
FIG. 5 is a sectional view of the toner supply container according to the first embodiment.
Figure 6:
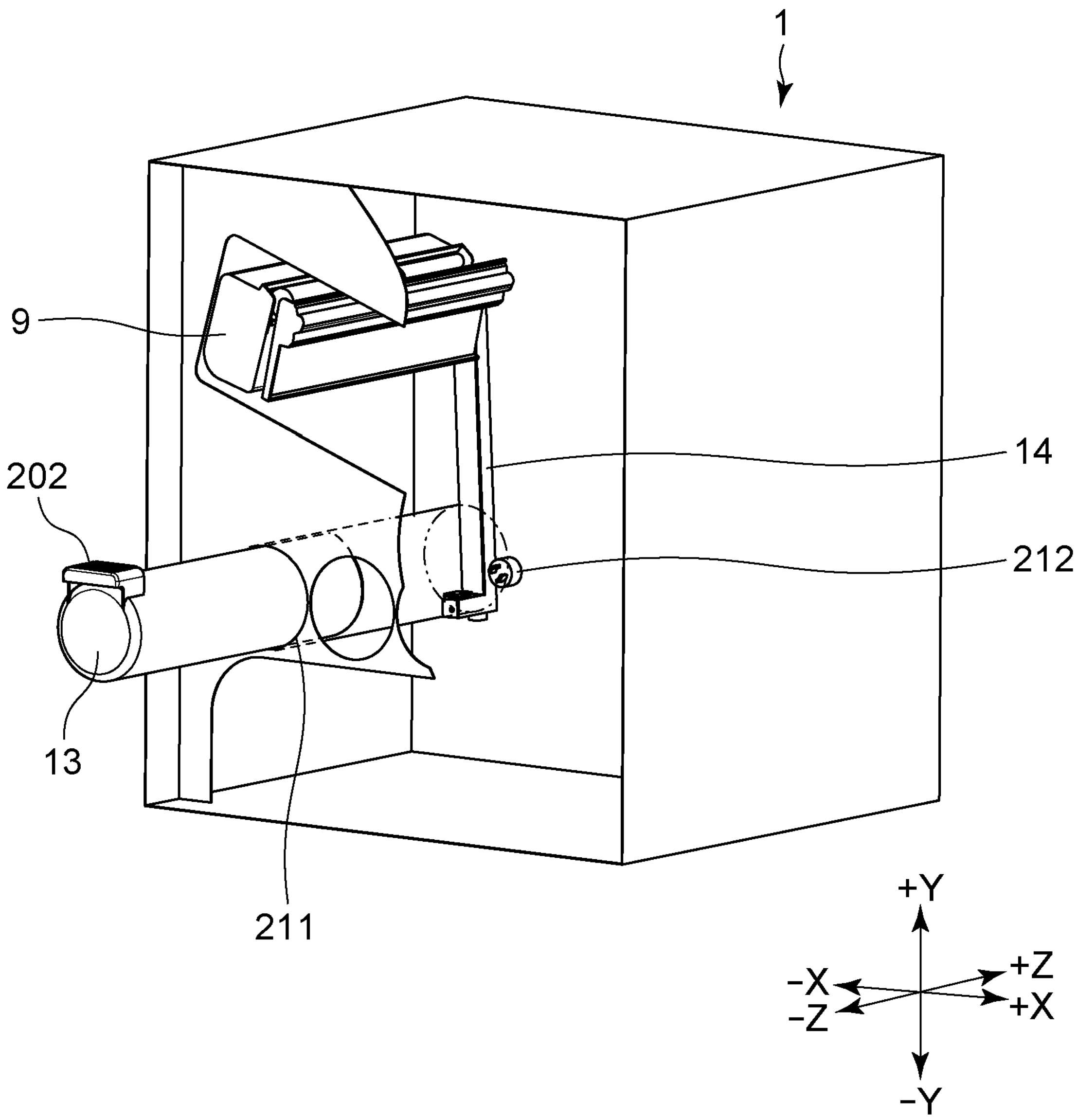
FIG. 6 is an illustration of attachment of the toner supply container according to the first embodiment.

The toner supply container 13 will be described in detail on the basis of FIGS. 4, 5, and 6. FIG. 4 is a perspective view of the toner supply container 13 from the far side of the sheet of FIG. 1. FIG. 5 is a sectional view of the toner supply container 13. FIG. 6 is a perspective view of the toner supply container 13 in the process of being attached to the body 1 of the image forming apparatus.

As illustrated in FIG. 4, the toner supply container 13 includes a container body 201 having the shape of a cylinder. Toner is stored in the container body 201. A handle 202 is disposed on a front wall portion of the toner supply container 13. A user can attach and detach the toner supply container 13 to and from the body 1 of the image forming apparatus by holding the handle 202. A driven projection 203 is disposed on a surface of a rear wall of the toner supply container 13 so as to be turnable. A gear 204 is formed integral with the driven projection 203. The gear 204 transmits motive power to a gear 205. A supply port 206 (FIG. 5) for supplying toner is formed in a lower wall portion of the container body 201, the lower wall portion being on the side of the rear wall. A shutter 207 and a seal 208 that fills a gap between the supply port 206 and the shutter 207 are disposed around the supply port 206. The shutter 207 and the seal 208 are integral with each other. The shutter 207 is held so as to be slidable in a longitudinal direction (generating direction of the cylinder) of the container body 201. The shutter 207 slides to open and close the supply port 206. When the toner supply container 13 is not attached to the body 1 of the image forming apparatus, the shutter 207 closes the supply port 206.

As illustrated in FIG. 5, a stirring member 209 and a toner conveyance member 210 are disposed inside the toner supply container 13. The gear 204 is connected to the stirring member 209. When motive power is transmitted from the body 1 to the driven projection 203, the stirring member 209 turns in the arrow-E direction. Toner is supplied to the toner conveyance member 210 while being stirred by the stirring member 209. The motive power applied to the driven projection 203 is transmitted to the gear 205 via the gear 204. The gear 205 is connected to the toner conveyance member 210. When the motive power is transmitted to the gear 205, the toner conveyance member 210 turns in the arrow-F direction, thereby causing the toner to move in the container body 201 toward the supply port 206. The toner conveyance member 210 is a resin screw having a spiral shape.

For attaching and detaching the toner supply container 13 to and from the side of a front surface of the body 1 of the image forming apparatus as illustrated in FIG. 6, an insertion portion (attachment location) 211, which is a portion through which the toner supply container 13 is attached, is formed in the front surface of the body 1 of the image forming apparatus. The insertion portion 211 is formed for each of four colors. The insertion portion 211 is an entrance of a space extending from the side of the front surface of the body 1 of the apparatus toward the rear side of the body 1. Each toner supply container 13 is inserted in the insertion portion 211 corresponding thereto. The toner supply container 13 is attached through the insertion portion 211 by being slid toward the rear side of the body 1 of the image forming apparatus while the handle 202 of the toner supply container 13 is held. A drive projection 212 integral with a gear is held on a rear-side wall surface (wall surface of the body 1) of the insertion portion 211 so as to be turnable. When the toner supply container 13 is attached to the body 1 of the image forming apparatus, the drive projection 212 engages the driven projection 203 (FIG. 4). Immediately before the toner supply container 13 is attached at a regular position, at which toner supply is available, the shutter 207 (FIG. 4) comes into contact with a projection (not shown) formed on the body 1 of the image forming apparatus. In this state, when the toner supply container 13 is pushed (in the +Z direction) toward the position at which toner supply is available, the shutter 207 slides to cause the supply port 206 (FIG. 4) be in an open state. The open state enables toner to be supplied. The toner in the toner supply container 13 is conveyed to the developing portion 9 corresponding thereto through the supply port 206 by the toner conveyance mechanism 14 corresponding thereto.

Details of Toner Conveyance Mechanism 14

Figure 7:
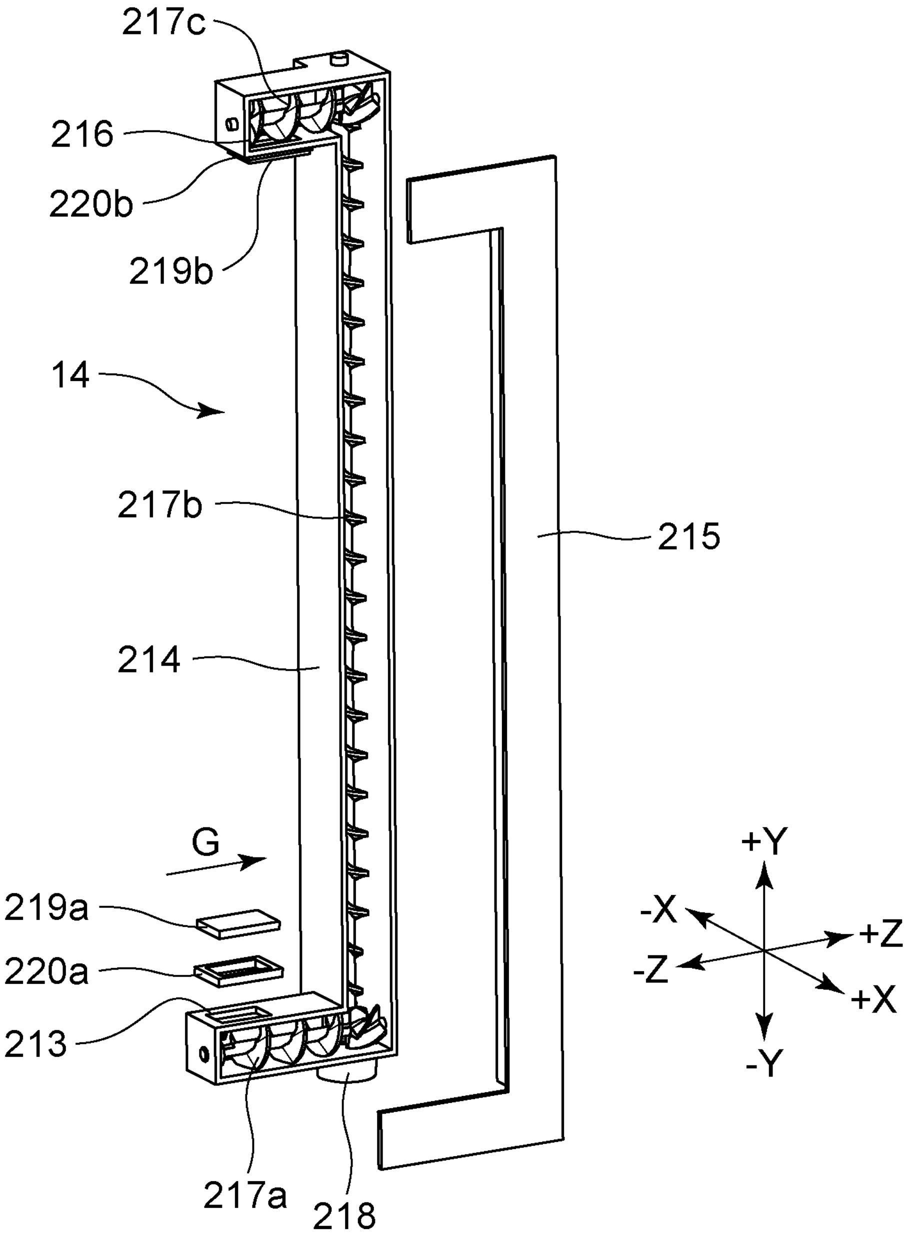
FIG. 7 is a detailed view of a toner conveyance mechanism according to the first embodiment.

As illustrated in FIG. 7, the toner conveyance mechanism 14 includes a toner inflow port 213 and a toner conveyance duct 214. The toner inflow port 213 receives the toner supplied through the supply port 206. The toner conveyance mechanism 14 further includes a cover 215, a toner discharge port 216, and toner conveyance members 217*a*, 217*b*, and 217*c* (toner conveyance members 217). The toner discharge port 216 is used for discharging the toner into the toner receiving opening 108. Note that the toner conveyance duct 214 and the cover 215 are illustrated in a separated manner in FIG. 7 for describing the inside of the toner conveyance mechanism; however, the toner conveyance duct 214 and the cover 215 are actually in close contact with each other due to, for example, a seal member or welding. Each toner conveyance members 217 is a resin screw having a spiral shape. Each toner conveyance member 217 is disposed in the toner conveyance duct 214 and supported at both ends thereof so as to be turnable. The toner conveyance members 217*a* and 217*c* are disposed perpendicular to the toner conveyance member 217*b*. A blade having a shape of a helical gear with a helix angle of 45° is disposed at each portion where the toner conveyance members 217*a*, 217*b*, and 217*c* engage each other. The blade is turned to cause drive transmission among the screws and cause toner to be conveyed. A driving gear 218 is disposed at an end portion of the toner conveyance member 217*b*. When drive is transmitted to the driving gear 218, each of the toner conveyance members 217*a*, 217*b*, and 217*c* turns in a direction in which the toner is conveyed.

The toner that has entered the toner inflow port 213 is conveyed to the toner discharge port 216 and discharged through the toner discharge port 216 into the toner receiving opening 108 formed in the developing portion 9 corresponding thereto. The toner inflow port 213 includes a shutter 219*a* and a seal 220*a* that fills a gap between the toner inflow port 213 and the shutter 219*a*. Note that in FIG. 7, the toner inflow port 213, the shutter 219*a*, and the seal 220*a* are illustrated in a separated manner to describe structures; however, the seal 220*a* and the shutter 219*a* are actually integral with each other. The shutter 219*a* is held by the toner conveyance duct 214 so as to be slidable in the arrow-G direction. The shutter 219*a* slides to open and close the toner inflow port 213. When the toner supply container 13 is not attached to the body 1 of the image forming apparatus, the shutter 219*a* closes the toner inflow port 213. Immediately before the toner supply container 13 is attached at the regular position, the shutter 219*a* comes into contact with a projection (not shown) formed on the toner supply container 13. Then, when the toner supply container 13 is further pushed in the +Z direction, the shutter 219*a* slides to cause the toner inflow port 213 to be in an open state. The toner discharge port 216 includes a shutter 219*b* and a seal 220*b* that fills a gap between the toner discharge port 216 and the shutter 219*b*. When the corresponding developing portion 9 is not attached to the body 1 of the image forming apparatus, the shutter 219*b* closes the toner discharge port 216. Immediately before the corresponding developing portion 9 is attached at the regular position, the shutter 219*b* comes into contact with a projection (not shown) formed on the corresponding developing portion 9. When the corresponding developing portion 9 is further pushed in the +Z direction, the shutter 219*b* slides to cause the toner discharge port 216 to be in an open state.

Figure 8:
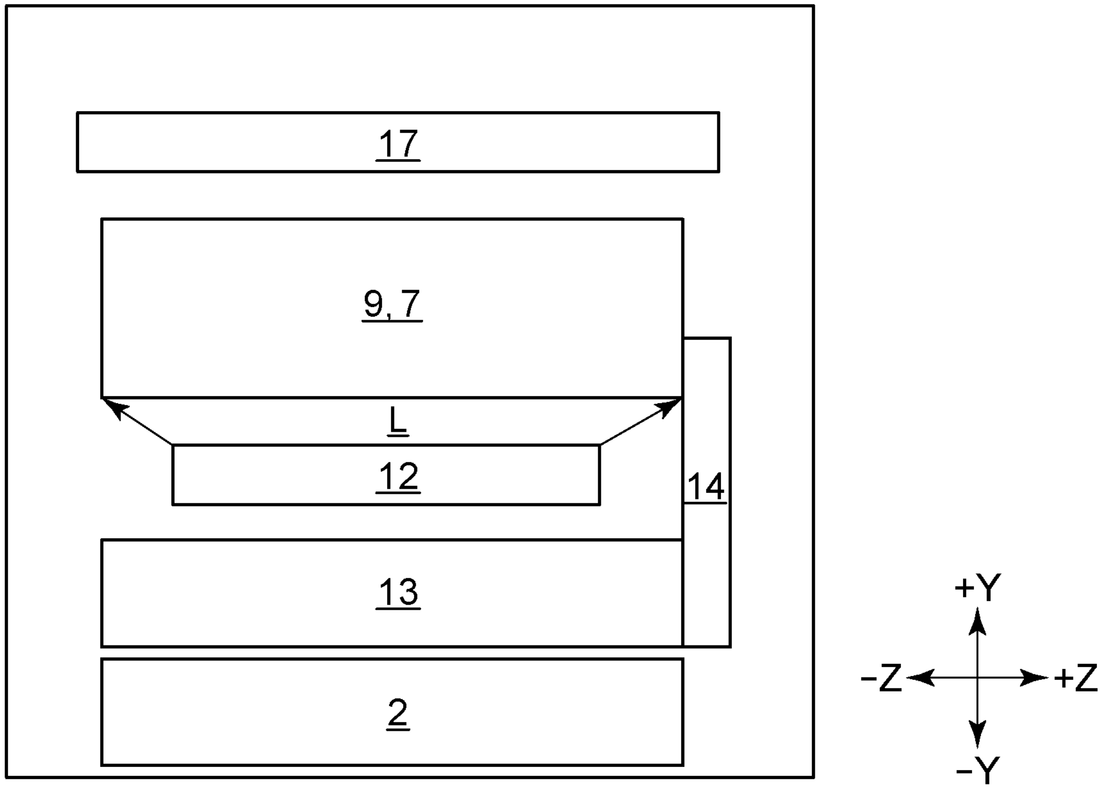
FIG. 8 is an illustration of relations in terms of depth between components in the image forming apparatus according to the first embodiment.

As described above, the image forming apparatus according to the first embodiment is configured to be capable of suppressing an increase in the temperature of the toner supply containers. Moreover, because the scanner unit 12 is a unit that scans a photosensitive member by deflecting a laser beam, a laser beam L emitted from the scanner unit 12 toward the photosensitive members 7 spreads in the Z-axis direction as illustrated in FIG. 8. In other words, in the Z-axis direction, the scanner unit 12 is smaller than the photosensitive members 7 and the developing portions 9. In particular, in the Z-axis direction, the scanner unit 12 is smaller than the intermediate transfer belt 17. Thus, disposing the toner conveyance mechanisms 14 does not increase the size of the apparatus. Not only an increase in the size of the apparatus that employs the scanner unit using the rotatable polygonal mirror but also an increase in the size of an apparatus that employs a scanner unit using a rotary deflector such as a galvano-mirror can be avoided by employing the structure according to the first embodiment.

As described above, it is possible to provide the image forming apparatus that suppresses an increase in the temperature of the toner supply containers while avoiding an increase in the size of the apparatus.

Second Embodiment

Figure 9:
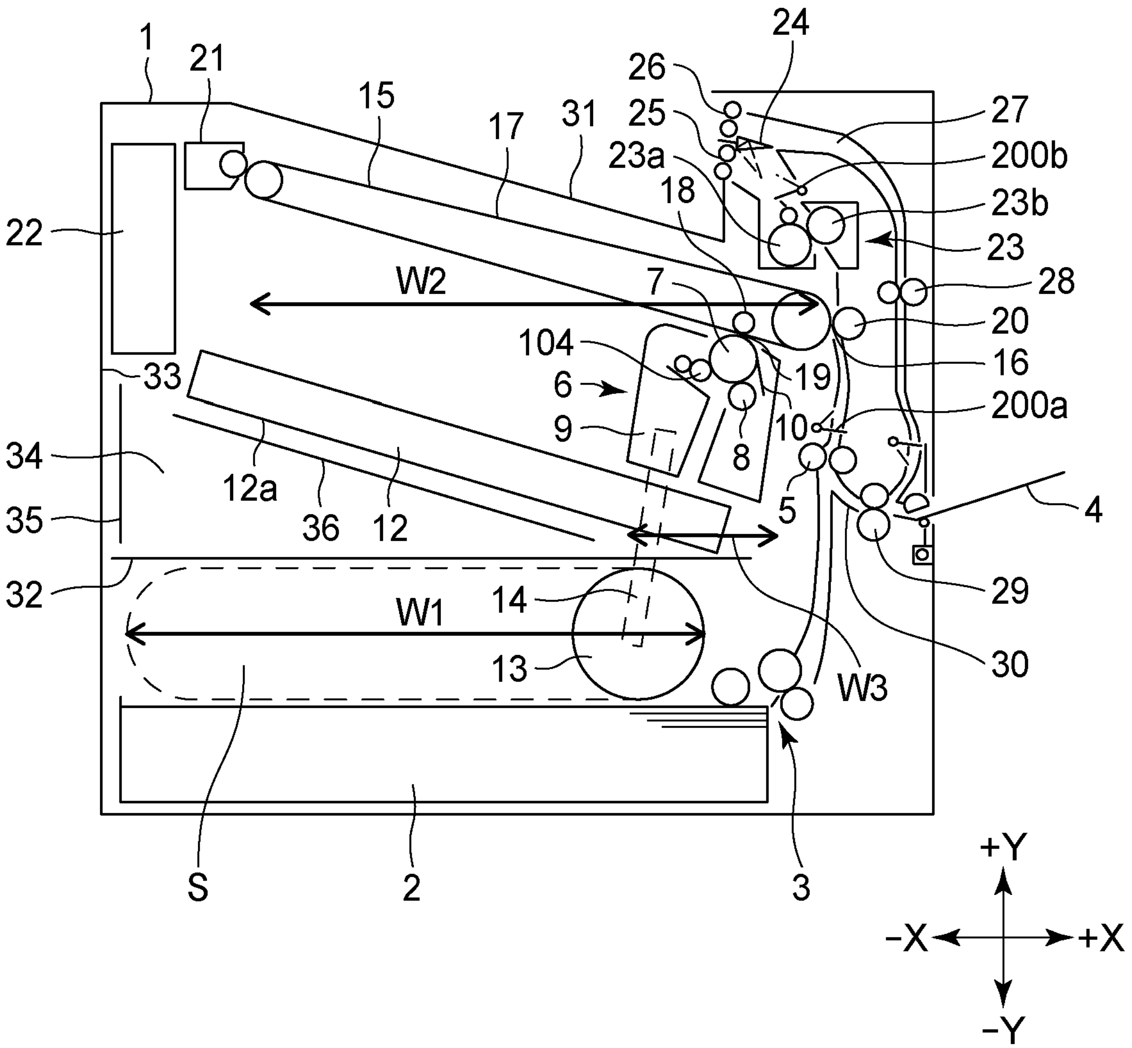
FIG. 9 is a sectional view of an image forming apparatus according to a second embodiment.
Figure 10:
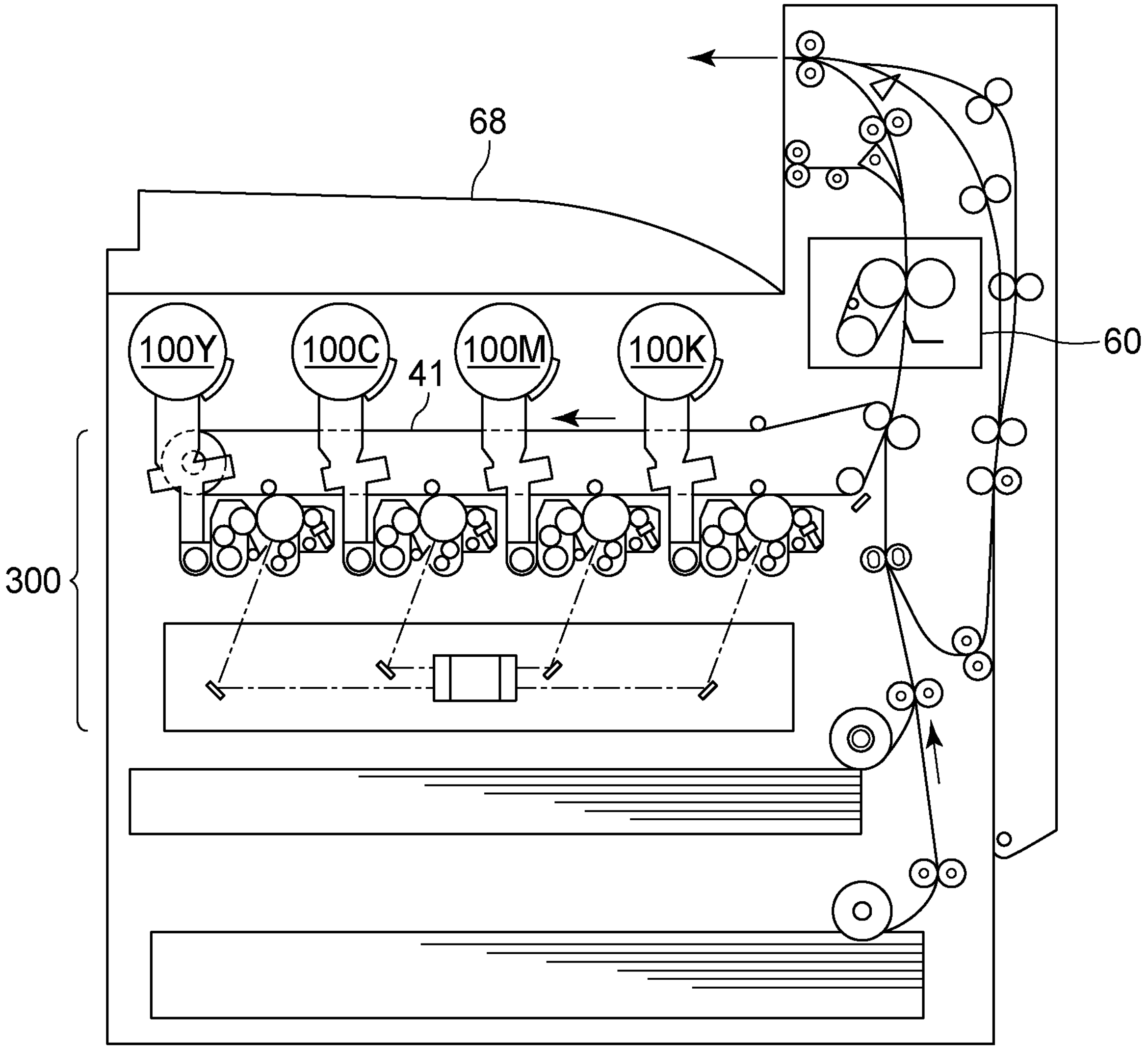
FIG. 10 is a figure presented in Japanese Patent Laid-Open No. 2014-178398.
Figure 11:
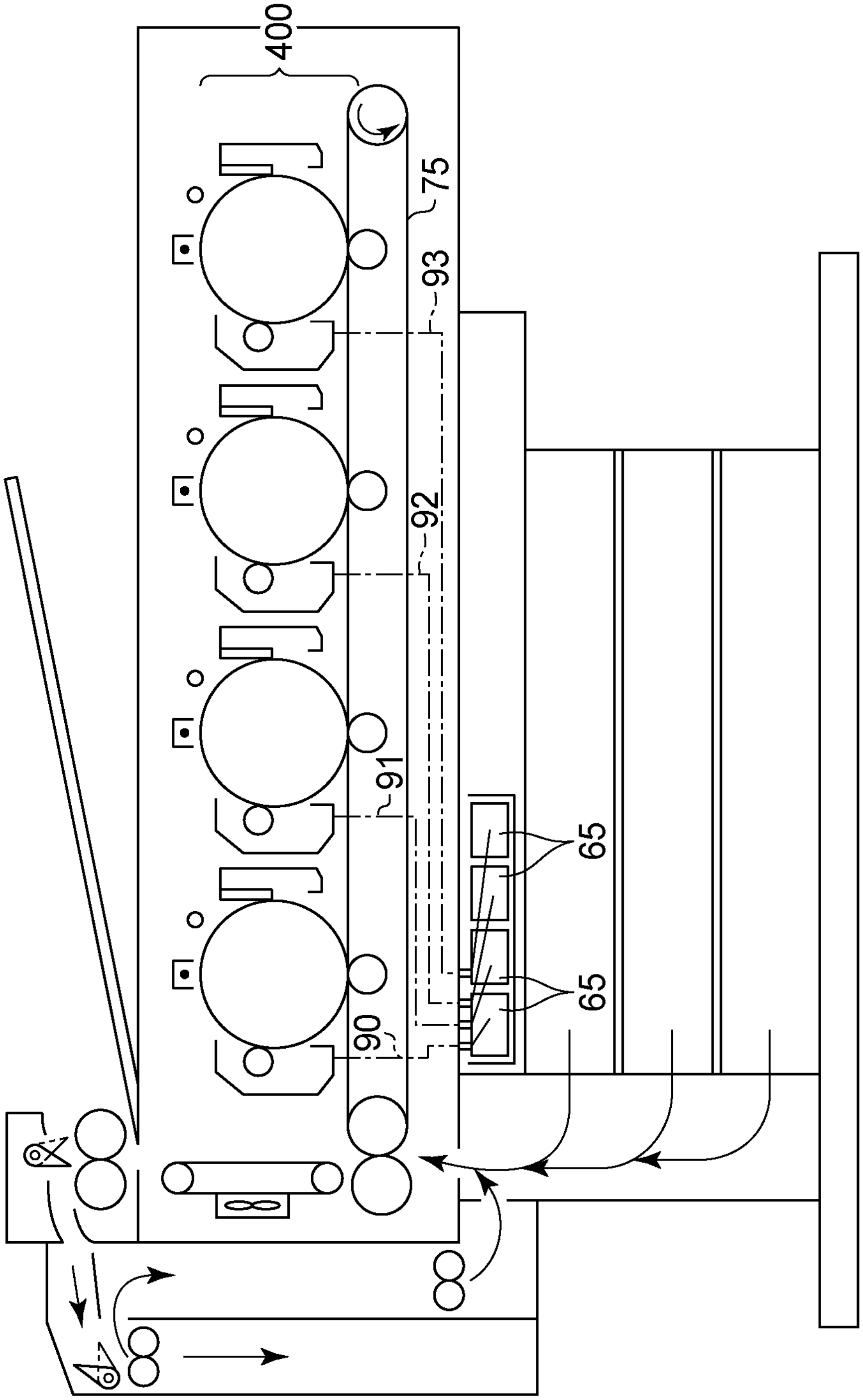
FIG. 11 is a figure presented in Japanese Patent Laid-Open No. 2002-244529.

The printer according to the second embodiment illustrated in FIG. 9 is a monochromatic printer. The printer according to the second embodiment includes one image forming portion 6 and one toner supply container 13 and is substantially the same as the printer according to the first embodiment in terms of other features. Thus, only differences therebetween will be described below.

The printer according to the second embodiment is the same as the color printer according to the first embodiment from which the image forming portions other than the image forming portion for black are removed. Thus, although the printer is a monochromatic printer, the printer includes the intermediate transfer belt 17 and other components. Using the same body and the same components as those of the color printer according to the first embodiment in the monochromatic printer according to the second embodiment provides an advantage such that it is possible to reduce costs for designing and manufacturing the apparatuses.

As illustrated in FIG. 9, because the monochromatic printer uses a body for a color printer, a space S for storing the toner supply containers 13 for yellow, magenta, and cyan is empty. Thus, in the second embodiment, the toner supply container 13 for black has a size substantially equal to the size of the whole area of the space S, which is indicated by a broken line in FIG. 9. Specifically, in a direction (X-axis direction in FIG. 1) perpendicular to the axial direction of the photosensitive member 7, the toner supply container has a width W1 that is substantially the same as a width W2 of the intermediate transfer belt 17 in the X-axis direction. Such a structure enables use of a toner supply container having a large capacity, leading to a reduction in the frequency of supplying toner. The toner supply container may have an oval shape or a rectangular shape when viewed in the Z-axis direction. The width W1 of the toner supply container may have any value that is at least greater than a width W3 of the image forming portion for black in the X-axis direction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:

1. An image forming apparatus comprising:

a plurality of rotatable photosensitive members;

a light scanning unit disposed below the plurality of the photosensitive members in a vertical direction and configured to scan the plurality of the photosensitive members with a beam corresponding to image information;

a plurality of developing portions configured to develop an electrostatic latent image formed on the corresponding photosensitive member by using a toner, each of the plurality of developing portions including a developing container configured to store the toner;

an intermediate transfer unit including an intermediate transfer belt onto which a toner image formed on each of the plurality of photosensitive members is transferred at a transfer position, wherein the intermediate transfer belt is disposed above each of the plurality of photosensitive members on a virtual line extending in the vertical direction through the corresponding transfer position;

a sheet tray disposed above the intermediate transfer belt in the vertical direction and configured to receive a sheet output from inside of the image forming apparatus, the image forming apparatus transferring the toner image transferred on the intermediate transfer belt onto the sheet and then outputting the sheet onto the sheet tray;

a sheet storing portion disposed below the light scanning unit in the vertical direction and configured to store a sheet;

a sheet feeding portion configured to feed the sheet stored in the sheet storing portion;

a plurality of toner supply containers arranged in a horizontal direction and configured to store a toner to be supplied to the corresponding developing portion; and a plurality of toner conveyance ducts configured to guide the toner conveyed from the corresponding toner supply container to the corresponding developing portion, wherein each toner supply container of the plurality of toner supply containers has a toner supply port, wherein the plurality of toner supply containers is disposed in between the light scanning unit and the sheet storing portion in the vertical direction such that the toner supply port of at least one toner supply container of the plurality of toner supply containers is disposed between the light scanning unit and the sheet storing portion in the vertical direction, wherein the plurality of rotatable photosensitive members, the light scanning unit, the plurality of toner supply containers, and the sheet storing portion are disposed in this order in the vertical direction, and wherein a part of the light scanning unit and a part of the plurality of toner conveyance ducts are at the same position in the vertical direction.

2. The image forming apparatus according to claim 1, wherein the image forming apparatus comprises a double-sided conveyance path to be used when a toner image is formed on a second surface of the sheet, and wherein the plurality of toner supply containers is disposed below a bottom part of the double-sided conveyance path in the vertical direction.

3. The image forming apparatus according to claim 1, wherein the image forming apparatus comprises a fixing unit configured to fix the toner image on the sheet, and wherein the plurality of toner supply containers is disposed below the fixing unit in the vertical direction.

4. The image forming apparatus according to claim 1, wherein the plurality of toner supply containers is configured to be detachable from a main body of the image forming apparatus without removal of the corresponding developing portion from the main body.

5. The image forming apparatus according to claim 1, wherein the plurality of toner supply containers is configured to be detachable from a main body of the image forming apparatus in a longitudinal direction of the each of the plurality of toner supply containers.

6. The image forming apparatus according to claim 1, wherein the image forming apparatus comprises a plurality of toner conveyance mechanisms configured to convey a toner from the corresponding toner supply containers to the corresponding developing portions.

7. The image forming apparatus according to claim 6, wherein, in a state where the plurality of toner supply containers is attached in the image forming apparatus, the corresponding toner conveyance mechanism is configured to convey the toner from the corresponding toner supply container in a first direction parallel to a longitudinal direction of the corresponding toner supply container, and then convey the toner upwards in the vertical direction, and then convey the toner to the corresponding developing container in a second direction opposite to the first direction.

8. The image forming apparatus according to claim 6, wherein the plurality of toner conveyance mechanisms is disposed below the plurality of photosensitive members.

9. The image forming apparatus according to claim 1, wherein a length of the light scanning unit is shorter than a length of the intermediate transfer belt in a rotational axis direction of the plurality of photosensitive members.

10. The image forming apparatus according to claim 1, wherein the image forming apparatus has only one light scanning unit, wherein a length of the light scanning unit is shorter than a length of the plurality of photosensitive members in a rotational axis direction of the plurality of photosensitive members, and wherein the light scanning unit is within a width of the plurality of developing portions in a rotational axis direction of the photosensitive member.

11. The image forming apparatus according to claim 10, wherein the plurality of toner conveyance ducts is disposed outside of the light scanning unit in the rotational axis direction.

12. The image forming apparatus according to claim 1, wherein the intermediate transfer unit is configured to be detachable from a main body of the image forming apparatus.

* * * * *